UNITED STATES PATENT OFFICE.

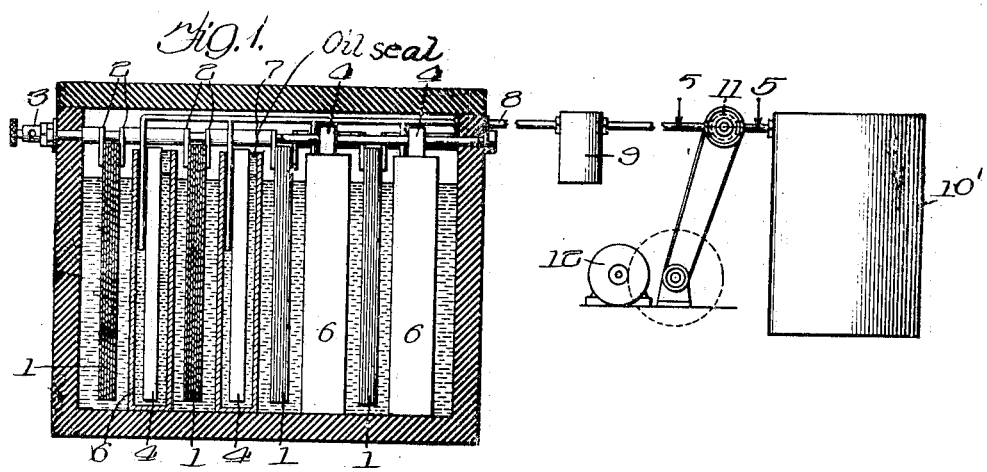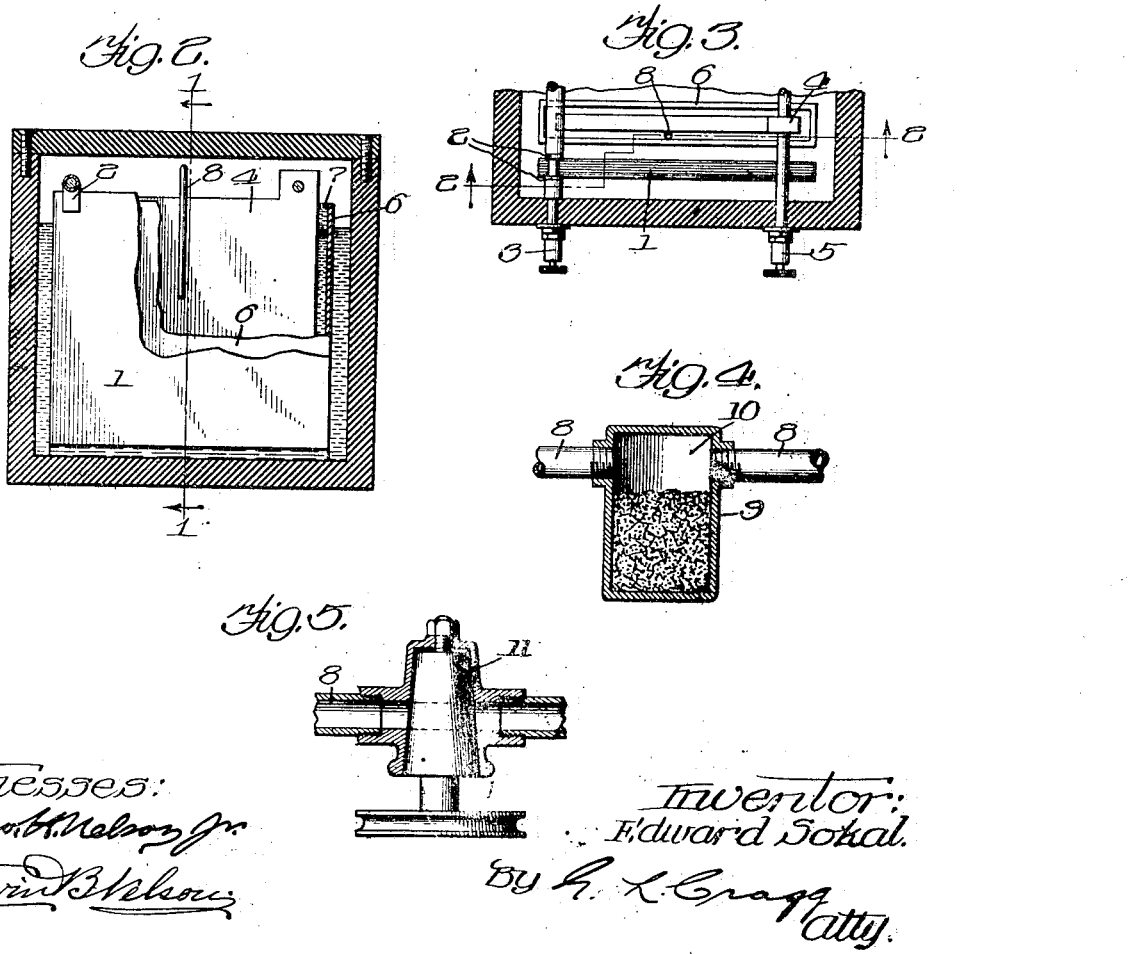

EDWARD SOKAL, OF CHICAGO, ILLINOIS.

BATTERY.

1,121,771.

Specification of Letters Patent.   Patented Dec. 22, 1914.

Application filed December 15, 1911.   Serial No. 665,921.

*To all whom it may concern:*

Be it known that I, EDWARD SOKAL, citizen of Austria, residing at Chicago, in the county of Cook and State of Illinois, have invented a certain new and useful Improvement in Batteries, of which the following is a full, clear, concise, and exact description, reference being had to the accompanying drawings, forming a part of this specification.

My invention relates to primary batteries and has a number of objects and advantages in view.

My invention has for one of its objects the provision of effective means whereby the insoluble electrodes of primary batteries may be prevented from becoming polarized.

The invention has for another of its objects the provision of an improved construction of soluble electrodes whereby they may readily be renewed; and also an improved mounting for the electrodes whereby they may readily be replaced.

My invention has other objects and advantages which will be fully described in connection with the accompanying drawing showing the preferred embodiment thereof and in which—

Figure 1 illustrates a primary battery in vertical section, as such battery is preferably constructed, certain internal portions of the battery being shown in full elevation, while auxiliary apparatus is shown to the right of the battery for the purpose of supplying the battery with the depolarizing element, the battery shown in Fig. 1 being taken on line 1 1 of Fig. 2; Fig. 2 is a sectional elevation on line 2 2 of Fig. 3; Fig. 3 is a sectional plan view of the portion of the battery illustrated in Fig. 1; Fig. 4 is a detail view showing a drier that is preferably used for preventing the passage of moisture to the source of gas supply; and Fig. 5 is a detail view showing mechanism for intermittently preventing and effecting communication between the gas tank and the battery interior.

Like parts are indicated by similar characters of reference throughout the different figures.

The battery includes four soluble electrodes 1 that are, in the preferred embodiment of the invention, made of assembled laminæ of iron, the group of laminæ composing each soluble electrode being interposed between the ears 2, all of the ears 2 being in electrical connection with one of the battery terminals 3, the other battery electrodes 4, which are desirably of carbon and are therefore insoluble, being electrically connected with the battery terminal 5. By making the soluble electrodes of laminæ the external sheets which are first dissolved may be removed and other sheets may be substituted whereby such electrodes may readily be restored to their original capacity. The electrolyte which I prefer to employ is one that includes a chlorin compound as a constituent, for example, sodium chlorid dissolved in water. I do not wish to be limited to the nature of the electrolyte. The element which I prefer to employ for preventing the insoluble electrodes from becoming polarized is chlorin gas which is dissolved in the electrolyte and in order to prevent the chlorin gas thus dissolved from readily passing to the soluble electrodes, I place a porous partition in each space that intervenes between the soluble and insoluble electrodes. These porous partitions are desirably in the form of porous cups 6, though I do not limit myself to porous partitions of such formation. The material of which the cups are made is desirably porous clay. Such porous cups are well known in primary battery practice. In order to prevent the gas from rising from the spaces within the porous cups, that is from the spaces occupied by the insoluble electrodes, I seal the upper ends of the cups 6 close to the upper level of the electrolyte in the cups as by means of paraffin oil as indicated at 7. The seals 7 serve to prevent free gas from passing from the electrolyte and to the soluble electrodes and attacking the same. I do not limit myself to any specific means for preventing the de-polarizing gas from passing to the soluble electrodes.

The depolarizing gas is passed into the interiors of the cups 6 through a pipe or duct 8 having branches that project into the cup interiors. This pipe 8 passes through the chamber 9 that contains some substance 10 for removing the vapor or moisture that might pass from the battery through the pipe to the source of gas supply indicated at 10′. Where chlorin gas is used as a depolarizer the substance 10 may be calcium chlorid. The tank 10′ desirably contains the chlorin under sufficient pressure as to maintain the same in a liquid condition. A valve 11, rotated by some suitable motor mechanism diagrammatically indicated at 12, serves to throw the pipe 8 into communication with the tank 10' and to cut off such communication whereby the chlorin is permitted to pass from the tank to the battery intermittently. The chlorin in its passage from the tank becomes gaseous and owing to the pressure behind it, is forcibly injected in the portions of the electrolyte that are contained in the cups 6. After the gas has been injected into the electrolyte it becomes dissolved therein and is then in condition to counteract the polarization of the insoluble electrodes 4. To accelerate the functioning of the depolarizing gas I desirably introduce a catalyzer into the porous cups, a suitable catalyzer being antimonium chlorid.

I do not wish to be limited, in all embodiments of the invention, to the use of a depolarizing agent which is in the form of chemically free chlorin. There are many advantages however in the use of chemically free chlorin in conjunction with soluble electrodes of iron and these advantages and other advantages will now be set forth.

The battery is capable of producing current of high voltage, say from 1.25 to 1.75 volts. The electrolyte may be selected as to give to the battery a very low internal resistance. Very cheap substances may be employed and the battery electrolyte may be regenerated readily and at small cost. Where the preferred substances are employed, as hitherto stated, the electrolyte and the substances therein that are taken from used batteries may be subjected to the action of an electric current whereby the chlorin and iron are produced in almost the same quantities in which they are consumed. Another way of restoring the metallic iron and the chlorin is to remove the water from the electrolyte and the products therein contained, by heating whereby the ferrous chlorid is precipitated, this ferrous chlorid being thereafter decomposed by heat into iron oxid and hydrochloric acid. The iron oxid and hydrochloric acid are thereafter readily reducible to secure metallic iron and chlorin by well known chemical methods. Certain features of my invention are of utmost importance because I am enabled readily to remove from the electrolyte the substances that are incorporated therewith as a result of the operation of the battery.

Where the porous cups are employed, the electrolyte within such cups is desirably ferric chlorid while the electrolyte without the porous cups is desirably sodium chlorid. The chlorin gas admitted to the cells would prevent the reduction of the ferric chlorid so that the chlorin gas would coöperate with the ferric chlorid to maintain the chemical nature of the electrolyte within the porous cups substantially constant while at the same time polarization of the insoluble electrodes is prevented. If the supply of chemically free chlorin should cease, the accumulated ferric chlorid within the porous cups would still serve to prevent the polarization of the insoluble electrodes. The porous cups, by confining the ferric chlorid, prevent the ferric chlorid from materially attacking the iron. The iron which is employed in the battery is, of course, very cheap and its electro-chemical equivalent is very low so that approximately one gram of iron is needed per ampere hour. Sodium chlorid, ferrous chlorid, ferric chlorid, and other chlorin containing substances may be suitably used as electrolytes, and they are very soluble in water, so that comparatively small amounts of water would be required even though the complete dissolving of the iron and a complete solution of the resulting product should be desired. I do not limit myself, however, in all embodiments of the invention, to the use of porous cups or partitions. The battery of my invention may be very light as compared with its capacity.

As will be understood from the foregoing description, my invention has a number of advantages and I do not wish to be limited to the realization of all of the advantages in any specific embodiment of the invention.

While I have herein shown and particularly described one way of practising my invention, it is obvious that changes may readily be made without departing from the spirit of my invention.

Having thus described my invention, I claim as new and desire to secure by Letters Patent the following:—

1. In a battery the combination of an electrolyte, an electrode soluble therein, another electrode insoluble therein, chlorin gas within the electrolyte and a liquid seal on the electrolyte to prevent the escape of the chlorin from the electrolyte.

2. In a battery the combination of an electrolyte, an electrode soluble therein, another electrode insoluble therein, means for conveying chlorin gas as a depolarizer directly into the electrolyte without creating an atmosphere of chlorin in contact with the electrolyte and means for preventing the passage of the depolarizer from the electrolyte.

In witness whereof, I hereunto subscribe my name this 13th day of December A. D., 1911.

EDWARD SOKAL.

Witnesses:
G. R. Cragg,
E. L. White.